Sept. 2, 1952  F. W. LINDSEY  2,609,301
FOOD PACKAGE
Filed April 5, 1949
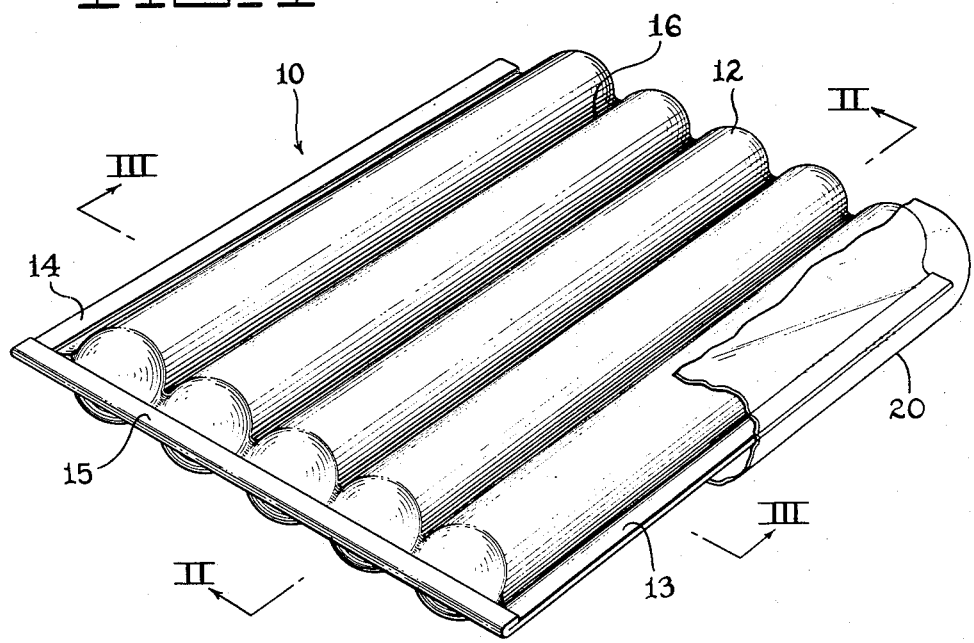
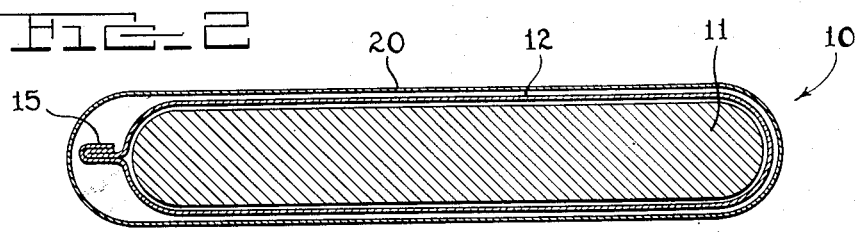
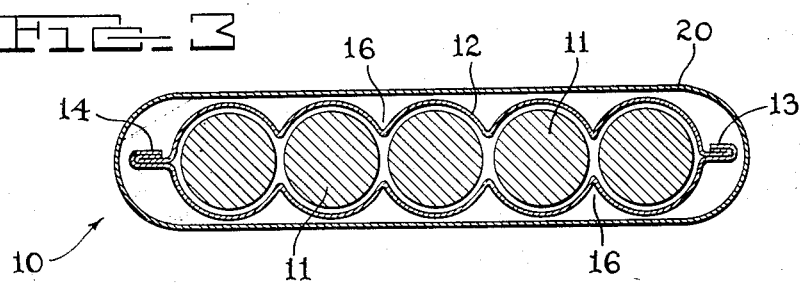
INVENTOR.
Frederick W. Lindsey
BY
His Attorney Patented Sept. 2, 1952

2,609,301

UNITED STATES PATENT OFFICE 2,609,301

FOOD PACKAGE

Frederick W. Lindsey, Baltimore, Md.

Application April 5, 1949, Serial No. 85,642

1 Claim. (Cl. 99—174)

This invention relates to food packages, and more especially to packages which contain foodstuff for vending.

An object of my invention is the provision of a sanitary, marketable package containing food such as partially cooked or wholly cooked meat, which package retains the food in a clean condition for selling, and is readily and quickly cooked or heated as desired as in a home oven or burner while effectively holding the food and the food juices enclosed.

A further object of my invention is that of providing a vendible food package which has a highly satisfactory heat-conductive wrapper to contain the food for cooking or heating, giving the food a grilled appearance and flavor.

Another object of the present invention is the provision of an easily produced, closed food package which is sufficiently heat-conductive to enable the goods therein to be cooked or heated from an external source, and which thereafter immediately cools to permit ready handling and opening to serve the cooked or heated food while hot.

A still further object of my invention is that of providing a marketable package of frankfurters, sausage or the like, the food being available for heating or cooking without opening the package.

Other objects of my invention in part will be obvious and in part pointed out more fully hereinafter.

The invention, accordingly, consists in the combination of materials, features of construction, and the resulting products as described herein, the scope of the application of which is indicated in the following claim.

In the accompanying drawing, representing a preferred embodiment of my invention:

Figure 1 is a perspective view of a package of frankfurters or other like food.

Figure 2 is a vertical longitudinal section of the package taken along the line 2—2 in Figure 1; and Figure 3 is a vertical transverse section of the package taken along the line 3—3 in Figure 1.

Like reference characters denote like parts or portions throughout the several figures of the drawing.

As conducive to a clearer understanding of certain features of my invention, it may be noted at this point that marketing operations as applied to any of a wide variety of foodstuffs introduce a considerable amount of handling and frequent exposure of the food to unclean conditions. A number of these commodities, such as wholly or partially cooked meats for example, are sold unwrapped and thus at best require washing before cooking. The food often is of a kind which very soon loses all of its juices upon being cooked or heated in an open receptacle, such as a frying pan, or directly on a grille or an oven tray. This loss of juices and flavor also is suffered by certain packaged food after the package is opened and the food is subjected to heating or cooking. Then, too, in being cooked in the open condition, the food is entirely free to give off odors which sometimes, in view of intensity, are objectionable, such as where the cooking is done in apartments or in other places where it is advantageous to suppress the odors.

An outstanding object of my invention, accordingly, is the provision of a food package representing a unitary product which may be displayed and sold in stores, which may be exposed to cooking or warming heat for the food while in substantially unopened condition, thus retaining juices and flavor and arresting the escape of cooking odors, and which gives prepared food having a grilled appearance and flavor.

Referring now more particularly to the practice of my invention, the food cooking packages which I provide include heat-conductive metal foil to hold and protect the food for marketing and to facilitate the operation of heating or cooking. This foil preferably is made of substantially pure aluminum or of an aluminum alloy, such as one including substantial amounts of magnesium. The aluminum, in addition to being capable of producing a protective oxide film which is substantially inert in the presence of foods, assures good heat-conductivity and thus gives an effective distribution of heat to the food while the package is being used for a cooking or heating container.

In certain instances, my food packages have the heat conductive metal foil so shaped that it substantially conforms to the food, thus reducing the air space inside the package and giving more direct heat transfer. I often achieve this substantial conformity of the metal and food by pressing or stamping a sheet or sheets of the foil to desired shape before or after introducing the food and enclosing the same.

As illustrative of the practice of my invention, I provide a food package 10, this for example containing a plurality of frankfurters 11, raw or cooked sausage, or the like, disposed in side-by-side relation. The frankfurters are enclosed by a cover 12 made of a sheet of foil containing substantially all aluminum or some other heat-conductive metallic material which will not be hurtful to the meat throughout the time this food remains wrapped. The foil sheet advantageously extends from one end of the frankfurter to around the other end and back (see Fig. 2) and is long enough and wide enough to give lips 13 and 14 and an end 15 all outward from the food and the main body of the package. The side lips 13 and 14 are double thicknesses of the foil and so is the front lip 15, these being formed by pressing the sheet together around the adjacent portions of the frankfurters 12, thus to provide the package. These double thicknesses conveniently are folded back upon themselves one or several times in toward the frankfurters, thus giving a substantially closed seal. If desired, I introduce a suitable sealing compound between the several thicknesses of the lips to make the package air-tight.

In order to increase the effective heating surface of the foil 12 next to the frankfurters 11, I press the foil down between the ridges of the adjacent frankfurters as at 16. The air space inside the package 10, accordingly, is quite small and substantially the whole surface of each frankfurter is directly adjacent to a portion of the foil for readily receiving heat from the same. I find too that by providing the foil pressed to the underlying food, there is considerably less opportunity for the package 10 to be punched open or ruptured in handling. By providing the side lips 13 and 14 and end lip 15, a greater mass of metal surrounds the food. Thus, these lips not only afford a closure for the package 10, but serve as heat welts which absorb heat and distribute it to that portion of the foil which overlies the meat.

There are occasions where I provide an external wrapper 20 over the foil 12. This outside wrapper 20 conveniently is made of paper, or of a transparent plastic, such as of cellulose grade, affording a substantially airtight enclosure to further protect the food during marketing. Usually, when employing the outer wrapper 20, I introduce printed matter to the same for identifying the food product. Also, the outside wrapper protects the foil beneath against rupturing or tearing and yet is readily removed to make the foil directly available for the heating or cooking of the contained food.

The package 10 is conveniently used as in a stove oven or a campfire grill, although a package of three or four frankfurters may be heated in an electric toaster. The foil protects the frankfurters against the direct effects of a large expanse of air or an open flame, yet is highly effective for distributing applied heat. Also, the foil keeps the meat substantially enclosed and the heating or cooking is successfully achieved in a small space. The juices and flavors, accordingly, are better retained. Moreover, the frankfurters have the browned pleasing appearance of having been grilled, rather than steamed or boiled as might be expected. And, too, they have the flavor of grilled food. I find that after the heating or cooking is completed, such as in accordance with instructions on the outside of the package with regard to heating temperature and period of time, it is but a simple matter to gain access to the food for serving. Surprisingly enough, the foil cools immediately, although the food remains piping hot.

Thus, it will be seen that in this invention there is provided a food package in which the various objects noted herein, together with many thoroughly practical advantages, are successfully achieved. It will be observed that the package represents a highly useful item of merchandise which is sanitary and conducive to better health from the standpoint of cleanliness. Further, it will be seen that the package presents the food in a thoroughly satisfactory form for marketing and handling or for storage in a deep freeze locker. Still further, it will be seen that the package retains the food for heating or cooking and, in this connection, affords many advantages in being a receptacle for transmitting externally applied heat.

With my packaged product, there is no necessity for use of pots and pans with consequent handling before and cleaning after use. Following cooking or heating of the packaged product, the wrapper may be disposed of. It will be seen, therefore, that the packaged product is most economical and efficient and is well adapted to modern living.

As many embodiments may be made of my invention and as many changes may be made in the embodiment hereinbefore set forth, it will be understood that all matter described herein is to be interpreted as illustrative and not as a limitation.

I claim:

A marketable package of frankfurters for heating in the unopened condition of the package, said marketable package comprising a plurality of frankfurters in flat side-by-side relation, and a wrapping of sheet metal foil substantially consisting of aluminum surrounding and enclosing the frankfurters as a group in substantial conformity to the shape of the group and to the shape of the individual frankfurters and in intimate contact therewith, said wrapping having at least one overlapping seam of double thickness forming a heat welt adjacent to the frankfurters to facilitate distribution of heat and handling of the heated package.

FREDERICK W. LINDSEY.

REFERENCES CITED

The following references are of record in the file of this patent:

UNITED STATES PATENTS

| Number | Name | Date |
|---|---|---|
| 1,544,077 | Fay | Sept. 15, 1925 |
| 1,965,769 | Kraft | July 10, 1934 |
| 2,058,662 | Broeg | Oct. 27, 1936 |
| 2,271,921 | Luker | Feb. 3, 1942 |
| 2,331,901 | Fisher | Oct. 19, 1943 |
| 2,470,579 | Rueckert | May 17, 1949 |

FOREIGN PATENTS

| Number | Country | Date |
|---|---|---|
| 439,603 | Great Britain | Dec. 10, 1935 |

OTHER REFERENCES

"Good Wrapping Materials Not Expensive When Properly Used" by J. D. Winter, University of Minnesota, reprinted from Locher Operator Magazine, August 1946, pages 1 to 4.